(12) United States Patent
Zanft (10) Patent No.: US 12,487,258 B2
(45) Date of Patent: Dec. 2, 2025

(54) SYSTEMS AND METHODS FOR POWER SUPPLIES WITH DYNAMIC VOLTAGE DROP COMPENSATION

(71) Applicant: Outdoor Wireless Networks LLC, Claremont, NC (US)

(72) Inventor: Steven Zanft, York (GB)

(73) Assignee: Outdoor Wireless Networks LLC, Richardson, TX (US)

( * ) Notice: Subject to any disclaimer, the term of this patent is extended or adjusted under 35 U.S.C. 154(b) by 266 days.

(21) Appl. No.: 18/547,060

(22) PCT Filed: Feb. 22, 2022

(86) PCT No.: PCT/US2022/017298
§ 371 (c)(1),
(2) Date: Aug. 18, 2023

(87) PCT Pub. No.: WO2022/182652
PCT Pub. Date: Sep. 1, 2022

(65) Prior Publication Data
US 2024/0125828 A1    Apr. 18, 2024

Related U.S. Application Data

(60) Provisional application No. 63/152,641, filed on Feb. 23, 2021.

(51) Int. Cl.
*G01R 19/165* (2006.01)
*G01R 19/25* (2006.01)
(Continued)

(52) U.S. Cl.
CPC ... *G01R 19/2513* (2013.01); *G01R 19/16576* (2013.01); *G01R 19/252* (2013.01);
(Continued)

(58) Field of Classification Search
CPC .......... G01R 19/2513; G01R 19/16576; G01R 19/252; G01R 27/16; G01R 31/58;
(Continued)

(56) References Cited

U.S. PATENT DOCUMENTS

| 7,714,592 B2 | 5/2010 | Radtke et al. |
| 9,448,576 B2 | 9/2016 | Chamberlain et al. |

(Continued)

FOREIGN PATENT DOCUMENTS

| WO | 2018136812 A1 | 7/2018 |
| WO | 2022182652 A1 | 9/2022 |

OTHER PUBLICATIONS

International Searching Authority, "International Search Report and Written Opinion", from PCT Application No. PCT/US2022/017298, Jun. 13, 2022, pp. 1 through 11, Published: WO.

*Primary Examiner* — Feba Pothen
(74) *Attorney, Agent, or Firm* — Fogg & Powers LLC (57) ABSTRACT

In one embodiment, a power supply comprises: a conversion circuit that outputs an output voltage at a first end of a cable; a remote voltage sensor measures a load delivered voltage from a second end of the cable; a control logic, wherein the power conversion circuit regulates the output voltage based on a signal from the control logic; a current sensor that measures current flow through the cable; and a resistance measurement circuit that computes a resistance of the cable as a function of the load delivered voltage, the current flow and the output voltage. The control logic regulates the load delivered voltage based on a voltage drop calculated utilizing the resistance. The control logic detects a change in the resistance of the cable based on the load delivered voltage and dynamically updates a value of the resistance for calculating the voltage drop when the change exceeds a tolerance.

11 Claims, 3 Drawing Sheets

(51) Int. Cl.
*G01R 19/252* (2006.01)
*G01R 27/16* (2006.01)
*G01R 31/58* (2020.01)
*H02H 3/04* (2006.01)
*H02H 7/22* (2006.01)

(52) U.S. Cl.
CPC ............. *G01R 27/16* (2013.01); *G01R 31/58* (2020.01); *H02H 3/042* (2013.01); *H02H 7/226* (2013.01)

(58) Field of Classification Search
CPC .... G01R 15/005; G01R 15/144; G01R 27/02; H02H 3/042; H02H 7/226
See application file for complete search history.

(56) References Cited

U.S. PATENT DOCUMENTS

| | | |
|---|---|---|
| 10,812,664 B2 | 10/2020 | Kostakis et al. |
| 11,129,095 B2 | 9/2021 | Gandhi |
| 2006/0119368 A1 | 6/2006 | Sela et al. |
| 2018/0164355 A1 | 6/2018 | Winkler et al. |
| 2018/0247727 A1* | 8/2018 | Ronay .................... H01Q 1/38 |
| 2020/0213940 A1 | 7/2020 | Gandhi |

\* cited by examiner

SYSTEMS AND METHODS FOR POWER SUPPLIES WITH DYNAMIC VOLTAGE DROP COMPENSATION

CROSS-REFERENCE TO RELATED APPLICATIONS

The present application claims priority to International Patent Application No. PCT/US2022/017298, titled "SYSTEMS AND METHODS FOR POWER SUPPLIES WITH DYNAMIC VOLTAGE DROP COMPENSATION", filed on Feb. 22, 2022, which claims the benefit of U.S. Patent Application Ser. No. 63/152,641, titled, "SYSTEMS AND METHODS FOR POWER SUPPLIES WITH DYNAMIC VOLTAGE DROP COMPENSATION", filed Feb. 23, 2021; the entire contents of the aforementioned patent applications are incorporated herein by reference as if set forth in their entirety.

BACKGROUND

Cellular base stations typically include, among other things, a radio, a baseband unit, and one or more antennas. The radio receives digital information and control signals from the baseband unit and modulates this information into a radio frequency ("RF") signal that is then transmitted through the antennas. The radio also receives RF signals from the antenna and demodulates these signals and supplies them to the baseband unit. The baseband unit processes demodulated signals received from the radio into a format suitable for transmission over a backhaul communications system. The baseband unit also processes signals received from the backhaul communications system and supplies the processed signals to the radio. A power supply may also be provided that generates suitable direct current ("DC") power signals for powering the baseband unit and the radio. For example, the radio is often powered by a (nominal) 48 Volt DC power supply in cellular systems that are currently in use today.

In order to increase coverage and signal quality, the antennas in many cellular base stations are located at the top of a tower, which may be, for example, about fifty to two hundred feet tall. Until recently, the power supply, baseband unit and radio were all located in an equipment enclosure at the bottom of the tower to provide easy access for maintenance, repair and/or later upgrades to the equipment. Coaxial cable are routed from the equipment enclosure to the top of the tower that carried signal transmissions between the radio and the antennas. In recent years, a shift has occurred and the radio is now more typically located at the top of the tower in new or upgraded cellular installations with the baseband unit and power supply remaining in the equipment enclosure at the bottom of the tower. A radio that is located at the top of the tower is typically referred to as a remote radio head ("RRH"). The coaxial cable carrying DC power to operate the RRH from equipment enclosure to the RRH can extend up the tower a distance of 200 feet or more. As such, a voltage drop, $V_{drop}$, can therefore be expected to occur along the length of the coaxial cable. Typically, a minimum required voltage for the power signal, a nominal or recommended voltage for the power signal and a maximum voltage for the power signal will be specified by the manufacturers for the RRH. The power supply at the base of the tower will output a compensated power supply output voltage, $V_{PS}$, that is controlled to result in a load delivered voltage, $V_{RRH}$, as delivered to the RRH, that will be between the minimum and maximum specified voltages for the power signal of the RRH. More specifically, the power supply will monitor the current draw, $I_{RRH}$, from the RRH, and is programed with a measurement of the resistance of the cable, $R_{Cable}$, so that it can determine an expected voltage drop using ohms law based on the relationship $V_{Drop}=I_{RRH}*R_{Cable}$ and from that control the power supply output voltage, $V_{PS}$, to obtain the desired voltage as delivered to the RRH, $V_{RRH}$, based on the relationship $V_{RRH}=V_{PS}-V_{Drop}$.

However, because changes in environmental conditions occur over time that affect the resistance of the cable, $R_{Cable}$ (such as, for example, cyclical changes in cable temperature due to seasonal temperature fluctuations, or gradual variations due to changes in climate) such a power supply is limited in its ability predictably deliver to the RRH a voltage, $V_{RRH}$.

For the reasons stated above and for other reasons stated below which will become apparent to those skilled in the art upon reading and understanding the specification, there is a need in the art for systems and methods for power supplies with dynamic voltage drop compensation.

SUMMARY

The Embodiments of the present disclosure provide methods and systems for power supplies with dynamic voltage drop compensation and will be understood by reading and studying the following specification.

In one embodiment, a programmable power supply comprises: a power conversion circuit configured to receive an input power voltage from an input port and output a power supply output voltage at a voltage output port, where the voltage output port is configured to couple to a first end of a power cable; a remote voltage sensor configured to couple to a second end of the power cable, wherein the remote voltage sensor is configured to measure a load delivered voltage from the second end of the power cable; a control logic coupled to a memory, wherein the power conversion circuit regulates the power supply output voltage based on a voltage control signal from the control logic; a current sensor coupled to the control logic, wherein the current sensor is configured to measure an electric current flow through the power cable; and a resistance measurement circuit, wherein the cable resistance measurement circuit is configured to compute a resistance of the power cable as a function of the load delivered voltage, the electric current flow through the power cable and the power supply output voltage; wherein the control logic is configured to control the power conversion circuit to regulate the load delivered voltage based on a voltage drop on the power cable between the first end and the second end, wherein the voltage drop is calculated utilizing the resistance of the power cable; wherein the control logic is configured to detect a change in the resistance of the power cable based on the load delivered voltage measured by the remote voltage sensor and dynamically updates a value of the resistance of the power cable used for calculating the voltage drop when the change exceeds a pre-determined acceptance tolerance.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Changes in ambient temperature can result in changes to an electrical cable's resistance, $R_{Cable}$. Because of such changes in cable resistance $R_{Cable}$, a power supply may supply an output voltage, $V_{PS}$, onto that cable that results in a voltage delivered to a load at the other end of the cable to be a different voltage than expected. Where the load is an RF transmitter, such as an RRH, the resulting voltage delivered to the RRH may no longer be a voltage within the manufactures specified tolerance of the nominal operating voltage, potentially causing equipment damage, or degradation of RF signal communications.

Embodiments of the present disclosure provide systems and methods for power supplies that comprise dynamic voltage drop compensation. That is, the power supply embodiments disclosure herein provide power supply output voltage regulation that dynamically accounts for time varying resistance values of electrical conductors in the power cable delivering the power to the connected load. In other words, both electric current flow and cable resistance are considered as time-varying dynamic parameters by the control logic regulating the power supply output voltage, $V_{PS}$. Accordingly, when the control logic calculates the voltage drop, $V_{Drop}$, introduced by a power cable (based on $V_{Drop}=f(I_{RRH}, R_{Cable})$) both $I_{RRH}$ and $R_{Cable}$ are considered as time-varying dynamic parameters.

In some embodiments, the control logic periodically computes an estimate, $V_{RRH\_Estimate}$ as a function of 1) the present power supply output voltage, $V_{PS}$, 2) an average current $I_{RRH}$ flowing through the power cable to the RRH, and 3) a previously obtained cable resistance measurement, $R_{Cable}$. A measurement of the actual load delivered voltage $V_{RRH}$ as delivered to the RRH is also obtained. The control logic considers the deviation between the measured $V_{RRH}$ and estimate $V_{RRH\_Estimate}$ and if the deviation exceeds a pre-determined tolerance, the control logic executes a calibration function to derive (e.g., recompute) an updated cable resistance measurement, $R_{Cable}$. The updated cable resistance measurement, $R_{Cable}$ may then be loaded by the control logic and utilized for regulating the power supply output voltage, $V_{PS}$, at a voltage level that results in the desired voltage $V_{RRH}$ delivered to the RRH. In this way, drifts or variations in the cable resistance are dynamically accounted for by the control logic without disruption of power to the RRH. In some embodiments, if regulating power supply output voltage, $V_{PS}$, based on the recomputed, $R_{Cable}$, does not bring the deviation between the next measured $V_{RRH}$ and estimate $V_{RRH\_Estimate}$ within the pre-determined tolerance, the control logic may flag the continued deviation as an indication of another system anomaly and generate an alarm to system operators.

Figure 1:
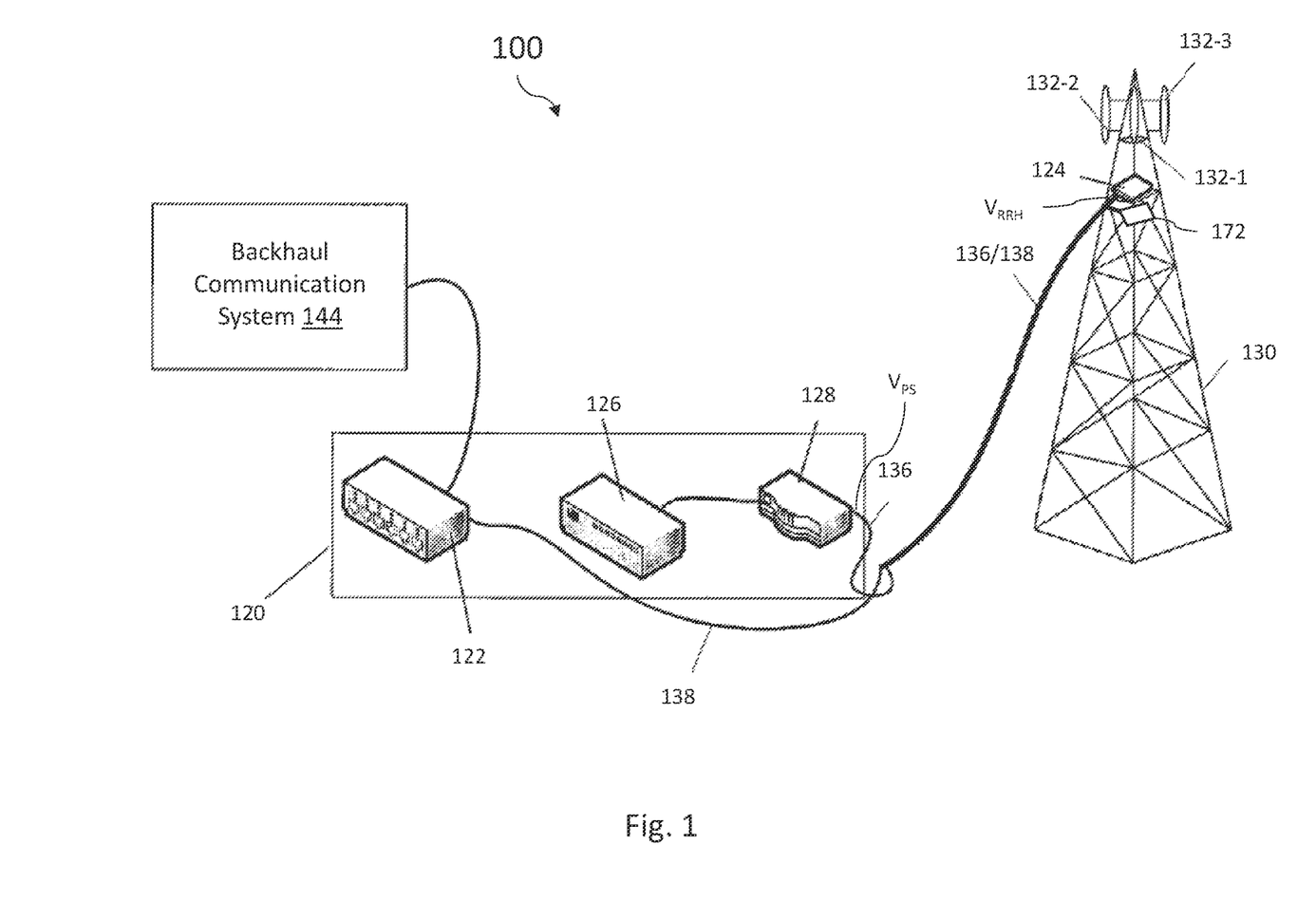
FIG. 1 is a diagram of an example base station 100 embodiment.

FIG. 1 is a schematic block diagram of an example embodiment of a base station 100 for wireless communications, such as a cellular base station. As shown in FIG. 1, the base station 100 includes distributed elements. In this embodiment, the elements are distributed between an equipment enclosure 120 (e.g., a vault, cabinet, housing, etc.) and a tower 130. The tower 130 may be a conventional antenna or cellular tower or other communications tower or may be another structure such as a utility pole, building, or the like. The base station 100 comprises a baseband unit 122, a first power supply 126 and a second power supply 128, which may be located within the equipment enclosure 120. The base station 100 further comprises an RRH 124 which may be coupled to a plurality of antennas 132 (for example, three sectorized antennas 132-1, 132-2, 132-3). The RRH 124 and antennas 132 are mounted on the tower 130, typically near the top thereof. As will be further explained below, the RRH 124 is electrically powered by a connection from the second power supply 128 via an electrical power cable 136. Within the context of this embodiment, the electrical power cable 136 comprises at least a pair of electrical conductors such that the power supply output voltage, $V_{PS}$, positive polarity terminal is coupled to one of the pair of electrical conductors, and the negative polarity terminal is coupled to the other of the pair of electrical conductors. As such the power supply output voltage, $V_{PS}$, may be measured at the power supply 128 by measuring the voltage between the pair of electrical conductors at the point where they are connected to the power supply 128. The voltage $V_{RRH}$ delivered to the RRH 124 as measured at the RRH 124 is determined by measuring the voltage between the pair of electrical conductors by a remote voltage sensor 172. This remote voltage sensor 172 is in communication with the second power supply 128. As will be discussed below in detail, the second power supply 128, specifically the resistance measurement circuit and/or control logic, utilizes measurements of the load delivered voltage $V_{RRH}$ from the remote voltage sensor 172 to dynamically detect and react to changes in the resistance of the power cable 136 for regulating its output voltage, $V_{PS}$.

In some embodiments, the RRH 124 receives digital information and control signals from the baseband unit 122 over a data cable 138 that is routed from the enclosure 120 to the top of the tower 130. The RRH 124 modulates this information into a radio frequency ("RF") signal at the appropriate cellular frequency that is then transmitted as downlink RF signals through one or more of the antennas 132. The RRH 124 receives uplink RF signals from the one or more of the antennas 132, demodulates these signals, and supplies the demodulated signals to the baseband unit 122 over the data cable 138. The uplink RF signals may be received be received by the antennas 132 from user equipment (UE) such as cellular phones, for example. The baseband unit 122 processes the demodulated uplink signals received from the RRH 124 and forwards the processed signals to a backhaul communications system 144 (such a wireless communication provider core network, for example). The baseband unit 122 also processes downlink signals received from the backhaul communications system 144 and supplies them to the RRH 124.

In some embodiments, the data cable 138 may comprise a fiber optic cable. In such an embodiment, the baseband unit 122 and the RRH 124 each include optical-to-electrical and electrical-to-optical converters that couple the digital information and control signals to and from the data cable 138. In other embodiments, the data cable 138 may instead carry communications traffic signals via electrical conductors. In still other embodiments, the data cable 138 and power cable 136 may be integrated together and implemented as a hybrid power-data cable.

In the embodiment shown in FIG. 1, the first power supply 126 generates one or more direct current ("DC") power signals. The second power supply 128 functions to perform a power shift or power boost function that augments power provided by the first power supply 126. For example, the second power supply 128, in some embodiments, may comprise a DC-to-DC converter that accepts the DC power signal output by the first power supply 126 as an input and outputs the power supply output voltage, $V_{PS}$ having a different voltage. Although FIG. 1 illustrates the first power supply 126 and second power supply 128 as being distinct hardware elements, in other embodiments, the elements and features of first power supply 126 and the second power supply 128 as described herein may be integrated as a single discrete power supply unit.

As noted above, the power supply output voltage, $V_{PS}$, from the power supply 128 is controlled to respond to variations in the current ($I_{RRH}$) of DC power drawn from the power supply 128 by the RRH 124. State-of-the-art RRHs are most typically designed to be powered by a 48 Volt (nominal) DC power signal. While the minimum DC power signal voltage at which the RRH 124 will operate and the maximum DC power signal voltage that may be provided safely to the RRH 124 without the threat of damage to the RRH 124 vary, typical values are a 38 Volt minimum DC power signal voltage and a 56 Volt maximum DC power signal voltage. According to some embodiments of the present invention, the programmable power supply 128 may be designed to deliver a relatively consistent voltage $V_{RRH}$ (for example, of about 54 or 52 Volts) to the RRH 124 at the far end of the power cable 136 in order to mitigate power loss associated with the voltage drop, $V_{Drop}$. It should be appreciated that in other embodiments, the RRH may instead operate at another nominal voltage than 48 Volts, in which case the corresponding minimum DC power signal voltage maximum DC power signal voltage would be defined based on that nominal voltage.

Figure 2:
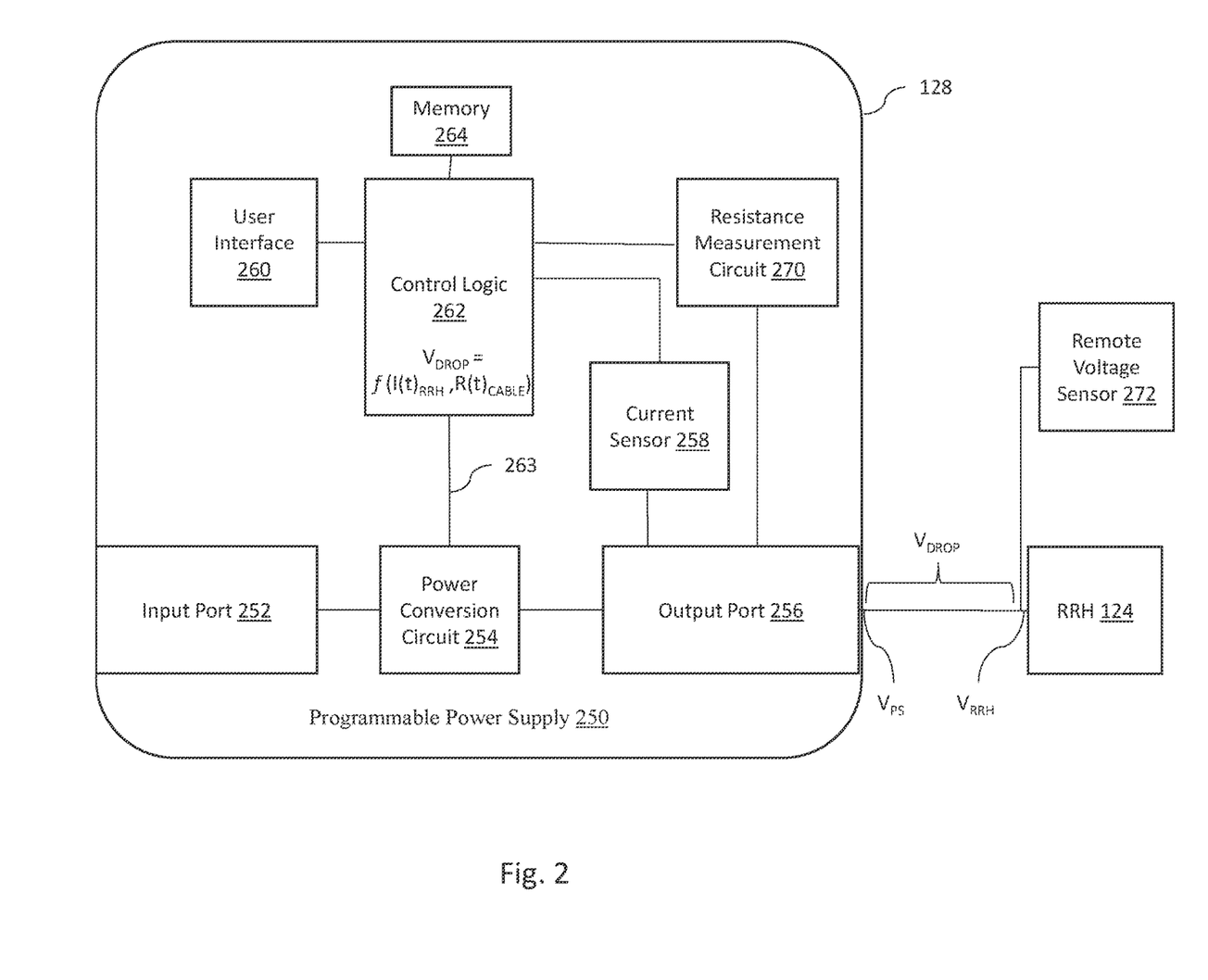
FIG. 2 is a diagram of an example programmable power supply embodiment.

FIG. 2 is a block diagram of a programmable power supply 250 which may be used to implement the second power supply 128 of FIG. 1 and its corresponding features. As shown in FIG. 2, the programmable power supply 250 includes a voltage input port 252, a power conversion circuit 254 and a voltage output port 256. The power supply 250 further includes control logic 262 and a memory 264, a current sensor 258, and a cable resistance measurement circuit 270 that may be used to measure a resistance of the power supply cable. The control logic 262 is coupled to the power conversion circuit 254 and outputs a voltage control signal 263 to the power conversion circuit 254. Based on the voltage control signal 263, the power conversion circuit 254 regulates the power supply output voltage, $V_{PS}$, to the appropriate voltage level as determined by the control logic 262.

In some embodiments, the programmable power supply 250 may optionally further include a user interface 260. In some embodiments, the conversion circuit 254 may be implemented by a DC-to-DC converter. In other embodiments, the conversion circuit 254 may be implemented by a AC-to-DC converter. However it should be understood that a wide variety of DC conversion circuits are known in the art, including, for example, electronic, electrochemical and electromechanical conversion circuits, which may be used for conversion circuit 254 in alternate embodiments. The cable resistance measurement circuit 270 may be implemented in a variety of ways and may comprise electronic circuitry and/or one or more algorithms executed by the control logic 262. The control logic 262 may comprise a processor or other programmable controller that executes code (which may be sorted in memory 264) to implement the functions and features attributed to the control logic 262 described herein. In various embodiments, the user interface 260 may comprise any form of human-machine-interface (HMI) such as, but not limited to a display, keypad, and/or touchscreen. In some embodiments, the user interface 260 may comprise a network interface configured to couple the control logic 262 to a network and through which the control logic 262 can receive user input or send information to an operator via the network.

The input port 252 may receive an input power voltage, for example a DC power signal such as the DC power signal output by power supply 126 of FIG. 1. In some embodiments, a DC power signal that is received at input port 252 may be utilized to power the control logic 262 and other elements of power supply 250 in addition to being used to provide the regulated power supply output voltage, $V_{PS}$, at the output port 256.

As discussed above, in order to deliver the desired voltage $V_{RRH}$ to the RRH 124 at the tower end of the power cable 136, the control logic 262 considers at least two operating parameters. The first parameter utilized by the control logic 262 is the current $I_{RRH}$ being drawn through the power cable 136 by the RRH 124 as determined by the current sensor 258. The current sensor 258 may be any appropriate circuit that senses the current level of the DC power signal output through the output port 256. The current $I_{RRH}$ drawn by the RRH 124 can be expected to vary over time depending upon, for example, the number of carriers and/or the amount of communication traffic being transmitting by the RRH 124 at any given time. The other factors affecting the current $I_{RRH}$ drawn by the RRH 124 can include whether the RRH 124 is in a steady-state mode, powering up or rebooting. The current sensor 258 senses the current $I_{RRH}$ flow of the DC power signal at output port 256 and provides the measurement to the control logic 262. In some embodiments, the current measurement provided by the current sensor 258 may be a time averaged value rather than an instantaneous current measurement. In other embodiments, the current measurement provided by the current sensor 258 may be an instantaneous current measurement that the control logic 262 time averages for the purpose of regulating the power supply output voltage, $V_{PS}$, at the output port 256.

The second parameter utilized by the control logic 262 is the resistance $R_{Cable}$ of the power cable 136 because, as discussed above, the voltage drop $V_{DROP}$ that occurs along the power cable 136 between the output port 256 and the RRH 124 is a function of both $R_{Cable}$ and $I_{RRH}$ as expressed by $V_{DROP}=I_{RRH} \times R_{Cable}$. In some embodiments, the user interface 260 can be utilized by a user to input an initial cumulative resistance value $R_{Cable}$ for the power cable 136. The user may obtain this value in various ways, for example, by calculation (for example, based on the length, size and material of the conductor of the power cable 136), direct measurement, or a combination thereof. In other embodiments, the user may input to the control logic 262 (via the user interface 260) physical characteristics of the power cable 136 (such as size, length, conductor material, model number, etc.) and algorithms, equations, look-up tables and the like that are stored in the memory 264 may be utilized by the control logic 262 to calculate or estimate an initial value for the resistance, $R_{Cable}$ of the power cable 136.

As discussed above, however, the resistance, $R_{Cable}$ of the power cable 136 is not a static parameter. Instead, the resistance will change over time as the ambient temperature conditions of its environment change. The resistance, $R_{Cable}$ of the power cable 136 may also change over time for other reasons such as degradations and/or damage to the power cable 136 itself, or its termination hardware. For example, a loose cable termination may promote corrosion that increases resistance. Accordingly, cable resistance measurement circuit 270 periodically tests and recomputes the resistance, $R_{Cable}$ of the power cable 136 (while the base station 100 remains in operation carrying communication traffic) providing the updated resistance, $R_{Cable}$ value to the control logic 262. The control logic 262, in turn, inputs the updated resistance, $R_{Cable}$ and begins regulation of the power supply output voltage, $V_{PS}$, at the output port 256 utilizing to updated resistance, $R_{Cable}$ to estimate the $V_{Drop}$. It should be understood that in some embodiments the cable resistance measurement circuit 270 may also be used to obtain the initial resistance, $R_{Cable}$ used at system initialization in place of user entered data.

The cable resistance measurement circuit 270 may be implemented in a variety of ways. In the embodiment shown in FIG. 2, the cable resistance measurement circuit 270 communicates with a remote voltage sensor 272 coupled to the RRH 124 end of power cable 136 to measure the actual voltage $V_{RRH}$ of the power delivered to the RRH 124 by cable 136. The remote voltage sensor 272 shown in FIG. 2 corresponds to the tower mounted remote voltage sensor 172 illustrated in FIG. 1.

In some embodiments, the power supply control logic 262 computes an estimate, $V_{RRH\_Estimate}$ that represents the voltage that it expects the remote voltage sensor 272 to measure from the RRH 124 end of power cable 136. This estimate, $V_{RRH\_Estimate}$ is calculated from the power supply output voltage, $V_{PS}$, and the average current $I_{RRH}$ (determined from measurement data from the current sensor 258) flowing through the power cable 136 to the RRH 124. The control logic 262 determines the deviation between the sensor 272 measured $V_{RRH}$ and the estimated $V_{RRH\_Estimate}$. If the computed deviation is within a pre-determined acceptance tolerance, then the cable resistance, $R_{Cable}$, presently being used by control logic 262 is likely an accurate representation of the present cable resistance of the power cable 136. Conversely, if the deviation exceeds the pre-determined acceptance tolerance, then the cable resistance, $R_{Cable}$, presently being used by control logic 262 is likely not an accurate representation of the present cable resistance of the power cable 136. As such, in one embodiment, when the deviation exceeds the acceptance tolerance, the control logic 262 executes a calibration function to recompute an updated cable resistance measurement, $R_{Cable}$. The cable resistance measurement circuit 270 recalculates the resistance of the power cable $R_{Cable}$ as a function of the sensor 272 measured load delivered voltage, $V_{RRH}$, the measured electric current flow through the cable, $I_{RRH}$, and the power supply output voltage, $V_{PS}$. The updated cable resistance measurement, $R_{Cable}$ is loaded by the control logic 262 and from that point, utilized for regulating the power supply output voltage, $V_{PS}$, to a voltage level that can be expected to provide a voltage $V_{RRH}$ to the RRH 124, that is within the input voltage range for the RRH 124. Gradual drifts or variations in the cable resistance are thus dynamically identified and accounted for by the control logic 262 without disruption of power to the RRH 124.

In some embodiments, if supplying the updated power supply output voltage, $V_{PS}$, based on the recomputed, $R_{Cable}$, does not bring the deviation between the next measured $V_{RRH}$ and estimate $V_{RRH\_Estimate}$ within the pre-determined tolerance, the control logic 262 may flag the continued deviation as an indication of a system anomaly. In one embodiment, the control logic 262 may generate an alarm via the user interface 260 to alert system operators of the system anomaly. For example, in some embodiments, the control logic 262 may be configured to identify a system anomaly when a substantial step-change in cable resistance has occurred over a short period of time, rather than the expected gradual change in cable resistance that can be attributed due to environmental temperature changes. Identification of such a substantial step-change in cable resistance may be based on computing the rate of change in measured cable resistances to a predetermined acceptable limit or threshold. In some embodiments, the control logic 262 may generate different levels of alarms depending on the magnitude of the step-change in cable resistance. For example, the detection of a step-change in cable resistance of a magnitude greater than a first threshold, but less than a second threshold, may cause the control logic 262 to issue a first level alarm indicating that a degradation has occurred, but the base station 100 remains in an operable condition. The detection a step-change in cable resistance of a magnitude greater than the second threshold may cause the control logic 262 to issue a more severe second level alarm indicating that a cable fault threatening to system operation has occurred. In some embodiments, the control logic 262 may respond to the more severe detection of a cable fault by disabling the conversion circuit 254 and/or voltage to output port 256. Similarly, the control logic 262 may be configured to identify a system anomaly when changes in cable resistance over time no longer appear cyclical, but are instead increasing or decreasing in an unbounded manner. For example, the control logic 262 may compare the presently computed cable resistance value to the initial cable resistance value determined at installation (or other baseline value) and generate an alarm if the cumulative deviation exceeds an acceptance threshold.

Figure 3:
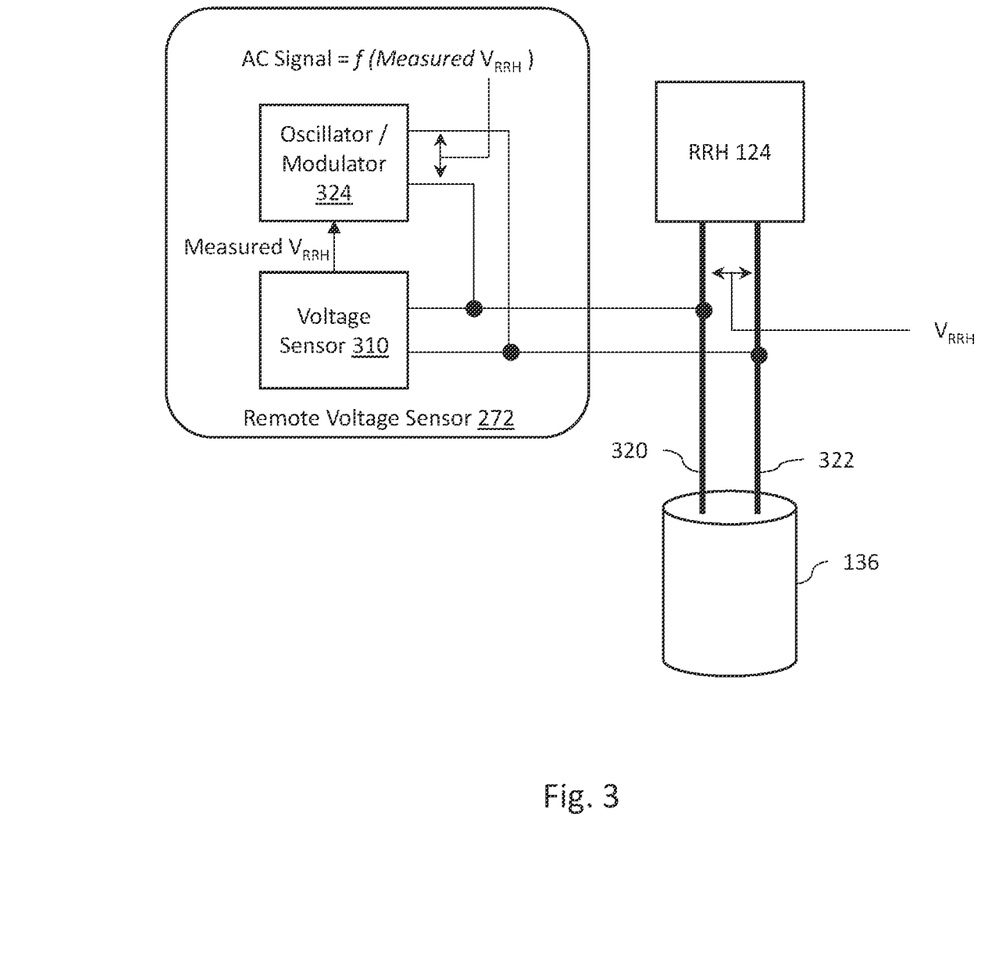
FIG. 3 is a diagram of an example remote voltage sensor embodiment.

Communication of a measured voltage $V_{RRH}$ from the remote voltage sensor 272 to the resistance measurement circuit 270 can be implemented in various ways, including ways that do not interfere with delivery of power to the RRH 124. As shown in FIG. 3, in some embodiments, the remote voltage sensor 272 is configured with a voltage sensor 310 to measure a voltage across between the pair of electrical conductors 320, 322 supplying power to the RRH 124. In some embodiments, the output of the voltage sensor 310 is electrically coupled to an input of a variable oscillator 324 (such as a voltage-controlled oscillator, for example). The variable oscillator 324 outputs an variable frequency oscillating alternating current (AC) signal whose frequency varies as a function of the input received from the voltage sensor 310. Accordingly, the frequency of the AC signal is indicative of the actual voltage $V_{RRH}$ of the power received by the RRH 124 via power cable 136. In the embodiment shown in FIG. 3, this oscillating AC signal is coupled onto the power cable 136 via which it propagates back to the output port 256 of the power supply 250 and is input by the resistance measurement circuit 270. The resistance measurement circuit 270 determines the frequency of this AC signal received from the remote voltage sensor 272 (for example, with a phase lock loop (PLL) or other frequency detection circuitry) to determine the actual voltage $V_{RRH}$ as measured by the voltage sensor 310. The cable resistance, $R_{Cable}$, is then subsequently computed by the resistance measurement circuit 270. For example, in one embodiment, the value of $V_{DROP}$ is calculated from the difference $V_{PS}$–$V_{RRH}$ and since $V_{DROP}=I_{RRH} \times R_{Cable}$, the value of $R_{Cable}$ is computed by dividing $V_{DROP}$ by the current average $I_{RRH}$ as determined from measurements from the current sensor 258.

In other embodiments, other methods may be implemented to communicate the voltage $V_{RRH}$ measured by the remote voltage sensor 272 to the resistance measurement circuit 270. For example, the remote voltage sensor 272 may comprise a modulator coupled to the voltage sensor 310 and configured to couple onto the power cable 136 a modulated (digital or analog) signal corresponding to the measured $V_{RRH}$ voltage level. The resistance measurement circuit 270 would comprise a corresponding demodulator to extract the measured $V_{RRH}$ voltage level from the modulated signal.

The difference between the measured $V_{RRH}$ and the power supply output voltage, $V_{PS}$, may be determined on an instantaneous basis, or on an average basis over a user designated time period. In some embodiments measurements of $V_{RRH}$ and $V_{PS}$ may be time stamped (for example, at the time they are received by the resistance measurement circuit 270) so that approximately contemporaneously captured measurements can be correlated with each other for calculating $R_{Cable}$.

In some embodiments, components of the the remote voltage sensor 272 can be powered by tapping the DC power being supplied to the RRH 124 from the power cable 136. Having the remote voltage sensor 272 as a discrete component configured to communicate voltage measurements with the resistance measurement circuit 270 facilitates implementation of embodiments not reliant on information supplied from the RRH 124. That is, the RRH 124 and Baseband Unit 122 may communicate operational system information with each other, including internal RF power levels and equipment voltages, that may also be indicative of the $V_{RRH}$ received by the RRH 124. However, that internal information is not accessible by the power supply 128, for example where the RRH 124 is third-party equipment and the information is only available via a proprietary channel or interface. Having access to a distinct remote voltage sensor 272 as disclosed herein, the power supply 250 can collect, measure, and/or estimate for itself all the information it needs to calculate $R_{Cable}$ and detect changes in that resistance. That said, in other embodiments, the remote voltage sensor 272 may be implemented as a component within the RRH 124 and the measured $V_{RRH}$ communicated back to the resistance measurement circuit 270 via the power cable 136.

Example Embodiments

Example 1 includes a programmable power supply comprising: a power conversion circuit configured to receive an input power voltage from an input port and output a power supply output voltage at a voltage output port, where the voltage output port is configured to couple to a first end of a power cable; a remote voltage sensor configured to couple to a second end of the power cable, wherein the remote voltage sensor is configured to measure a load delivered voltage from the second end of the power cable; a control logic coupled to a memory, wherein the power conversion circuit regulates the power supply output voltage based on a voltage control signal from the control logic; a current sensor coupled to the control logic, wherein the current sensor is configured to measure an electric current flow through the power cable; and a resistance measurement circuit, wherein the cable resistance measurement circuit is configured to compute a resistance of the power cable as a function of the load delivered voltage, the electric current flow through the power cable and the power supply output voltage; wherein the control logic is configured to control the power conversion circuit to regulate the load delivered voltage based on a voltage drop on the power cable between the first end and the second end, wherein the voltage drop is calculated utilizing the resistance of the power cable; wherein the control logic is configured to detect a change in the resistance of the power cable based on the load delivered voltage measured by the remote voltage sensor and dynamically updates a value of the resistance of the power cable used for calculating the voltage drop when the change exceeds a pre-determined acceptance tolerance.

Example 2 includes the programmable power supply of Example 1, wherein the remote voltage sensor comprises: a voltage sensor coupled to the second end of the power cable; and an oscillator coupled to the second end of the power cable and configure to receive an output of the voltage sensor; wherein the oscillator couples onto the power cable a variable frequency signal, wherein a frequency of the variable frequency signal is a function of the output from the voltage sensor; and wherein the resistance measurement circuit is configured to determine the load delivered voltage from the frequency of the variable frequency signal.

Example 3 includes the programmable power supply of any of Examples 1-2, wherein the remote voltage sensor comprises: a voltage sensor coupled to the second end of the power cable; and a modulator coupled to the second end of the power cable and configure to receive an output of the voltage sensor; wherein the modulator couples onto the power cable a modulated signal that communicates the output of the voltage sensor; and wherein the resistance measurement circuit is configured to determine the load delivered voltage from the modulated signal.

Example 4 includes the programmable power supply of any of Examples 1-3, wherein the control logic periodically computes an estimated load delivered voltage and determines a deviation between the estimated load delivered voltage and the load delivered voltage measured by the remote voltage sensor to detect the change in the resistance of the power cable.

Example 5 includes the programmable power supply of Example 4, wherein the control logic computes the estimated load delivered voltage as a function of: the power supply output voltage; an average current $I_{RRH}$ flowing through the power cable; and a previously obtained cable resistance measurement.

Example 6 includes the programmable power supply of any of Examples 4-5, wherein when the change in the resistance of the power cable continues to exceed the pre-determined acceptance tolerance after the update to the value of the resistance of the power cable used for calculating the voltage drop, then the control logic generates an alarm to system operators.

Example 7 includes the programmable power supply of any of Examples 4-6, wherein the remote voltage sensor is mounted to a tower of a tower and the second end of the power cable supplies power to a remote radio head of a base station.

Example 8 includes the programmable power supply of any of Examples 1-7, wherein the power conversion circuit comprises a DC-to-DC converter or and AC-to-DC converter.

Example 9 includes the programmable power supply of any of Examples 1-8, wherein the input power is configured to receive the input power voltage as a DC voltage signal from another power supply.

Example 10 includes the programmable power supply of any of Examples 1-9, wherein the power supply output voltage is controlled by the control logic to respond to variations in DC power drawn from a load coupled to the second end of the power cable.

Example 11 includes the programmable power supply of any of Examples 1-10, further comprising a user interface coupled to the control logic, wherein the control logic is configured to further update the value of the resistance of the power cable based in an input to the user interface.

Example 12 includes the programmable power supply of any of Examples 1-11, wherein the resistance measurement circuit periodically tests and recomputes the resistance of the power cable and provides the update of the value of the resistance of the power cable used for calculating the voltage drop.

Example 13 includes a base station for wireless communications, the base station comprising: a baseband unit configured to communicate with a backhaul communications system; a remote radio head coupled to the baseband unit, wherein the remote radio head is configured to receive downlink RF signals from the baseband unit and transmit the downlink RF signals through one or more of antennas, wherein the remote radio head is configured to receive uplink RF signals from the one or more of antennas and output the uplink RF signals to the baseband unit; a first power supply that outputs a first DC power signal; and a second power supply that inputs the first DC power signal and outputs a regulated power supply output voltage to a first end of a power cable; wherein the second power supply comprises: a power conversion circuit configured to receive the first DC power signal and output the power supply output voltage at a voltage output port, where the voltage output port is configured to couple to the first end of a power cable; a remote voltage sensor configured to couple to a second end of the power cable coupled to the remote radio head, wherein the remote voltage sensor is configured to measure a load delivered voltage from the second end of the power cable; a resistance measurement circuit, wherein the cable resistance measurement circuit is configured to compute a resistance of the power cable; a control logic coupled to a memory, wherein the power conversion circuit regulates the power supply output voltage based on a voltage control signal from the control logic; wherein the control logic is configured to control the power conversion circuit to regulate the load delivered voltage based on a voltage drop on the power cable between the first end and the second end, wherein the voltage drop is calculated utilizing the resistance of the power cable; wherein the control logic is configured to detect a change in the resistance of the power cable based on the load delivered voltage measured by the remote voltage sensor and dynamically updates a value of the resistance of the power cable used for calculating the voltage drop when the change exceeds a pre-determined acceptance tolerance.

Example 14 includes the base station of Example 13, further comprising: a current sensor coupled to the control logic, wherein the current sensor is configured to measure an electric current flow through the power cable; and wherein the cable resistance measurement circuit is configured to compute the resistance of the power cable as a function of the load delivered voltage, the electric current flow through the power cable and the power supply output voltage.

Example 15 includes the base station of any of Examples 13-14, wherein the remote radio head is mounted to a tower and the baseband unit is located in an enclosure remote from the tower.

Example 16 includes the base station of any of Examples 13-15, wherein the power supply output voltage from the second power supply is controlled by the control logic to respond to variations in DC power drawn from the remote radio head.

Example 17 includes the base station of any of Examples 13-16, wherein the remote voltage sensor comprises: a voltage sensor coupled to the second end of the power cable; and an oscillator coupled to the second end of the power cable and configure to receive an output of the voltage sensor; wherein the oscillator couples onto the power cable a variable frequency signal, wherein a frequency of the variable frequency signal is a function of the output from the voltage sensor; and wherein the resistance measurement circuit is configured to determine the load delivered voltage from the frequency of the variable frequency signal.

Example 18 includes the base station of any of Examples 13-17, wherein the remote voltage sensor comprises: a voltage sensor coupled to the second end of the power cable; and a modulator coupled to the second end of the power cable and configure to receive an output of the voltage sensor; wherein the modulator couples onto the power cable a modulated signal that communicates the output of the voltage sensor; and wherein the resistance measurement circuit is configured to determine the load delivered voltage from the modulated signal.

Example 19 includes the base station of any of Examples 13-18, wherein, wherein the control logic periodically computes an estimated load delivered voltage and determines a deviation between the estimated load delivered voltage and the load delivered voltage measured by the remote voltage sensor to detect the change in the resistance of the power cable.

Example 20 includes the base station of any of Examples 13-19, wherein when the change in the resistance of the power cable continues to exceed the pre-determined acceptance tolerance after the update to the value of the resistance of the power cable used for calculating the voltage drop, then the control logic generates an alarm to system operators.

In various alternative embodiments, system and/or device elements, method steps, or example implementations described throughout this disclosure (such as any of power conversion circuit, control logic, remote voltage sensor, current sensor, resistance measurement circuit, remote radio head, base band unit, base station, user interface, network interface, or any controllers, circuits, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, wireless radio communications related terms such as any of: power conversion circuit, control logic, remote voltage sensor, current sensor, resistance measurement circuit, remote radio head, base band unit, base station, user interface, network interface, or any controllers, circuits, refer to the names of elements that would be immediately recognized and understood by those of skill in the art of telecommunications and networks and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method for dynamically updating a resistance of electrical conductors configured to electrically couple an output of a power supply to a radio, wherein first ends of the electrical conductors are electrically coupled to the radio and a second ends, opposite the first ends of the electrical conductors, are electrically coupled to the output of the power supply, the method comprising:
   obtaining a first resistance of the electrical conductors;
   determining a first voltage at first ends of the electrical conductors based on the first resistance;
   receiving a signal indicative of a voltage measured at the first ends of the electrical conductors based upon a parameter of the signal or data modulated on the signal;
   determining a second voltage at the first ends of the electrical conductors based on the parameter of the signal or the data modulated on the signal;
   determining a second resistance of the electrical conductors based on the second voltage;
   measuring a level of current flowing through the output of the power supply; and
   providing an output voltage at the output of the power supply based on the level of current and the second resistance.

2. The method of claim 1, wherein determining the second resistance of the electrical conductors based on the first voltage and the second voltage comprises:
   determining if a difference between the first voltage and the second voltage exceeds a tolerance level; and
   determining that the difference exceeds the tolerance level, only then determining the second resistance.

3. The method of claim 1, comprising:
   generating a first alarm indicating a degradation has occurred when a difference between the first resistance and the second resistance of the electrical conductors exceeds a first threshold level; and
   generating a second alarm indicating a threat to system operation has occurred after the first alarm when the difference between the first resistance and the second resistance of the electrical conductors exceeds a second threshold level higher than the first threshold level.

4. The method of claim 3, comprising disabling the output voltage at the output of the power supply when the difference between the first resistance and the second resistance of the electrical conductors exceeds the second threshold level.

5. The method of claim 1, wherein obtaining the first resistance comprises:
   receiving physical characteristics of the electrical conductors including at least one of: conductor size, conductor length, conductor material, and conductor identifying parameters; and
   determining the first resistance of the electrical conductors based on the physical characteristics.

6. A power supply configured to provide electrical power through electrical conductors to an output port of a radio coupled to first ends of the electrical conductors, wherein the first ends of the electrical conductors are electrically coupled to the radio and a second ends, opposite the first ends of the electrical conductors, are electrically coupled to the output port of the power supply, the power supply comprising:
   an input port;
   the output port;
   a current sensor configured to measure a level of current flowing through the output port;
   processing circuitry coupled to the current sensor, wherein the processing circuitry is configured to control an output of power conversion circuitry, wherein the processing circuitry is configured to:
      receive the level of current flowing through the output port;
      obtain a first resistance of the electrical conductors;
      determine a first voltage at the first ends of the electrical conductors based on the first resistance;
      receive, at the output port, a measurement signal indicative of a voltage measured at the first ends of the electrical conductors based upon a parameter of the measurement signal or data modulated on the measurement signal;
      determine a second voltage at the first ends of the electrical conductors based on the parameter of the measurement signal or the data modulated on the measurement signal;
      determining a second resistance of the electrical conductors based on the second voltage; and
      providing a voltage control signal based upon the level of current and the second resistance; and
   the power conversion circuitry coupled to the processing circuitry, configured to receive an input voltage from the input port and the voltage control signal from the processing circuitry, and configured to provide an output voltage, based upon the voltage control signal, to the output port.

7. The power supply of claim 6, wherein the processing circuitry is configured to determine the second resistance of the electrical conductors when a difference between the first voltage and the second voltage exceeds a tolerance level; and configured to configure the power conversion circuitry to output an adjusted output voltage configured to be provided to the first ends of the electrical conductors based on the second resistance.

8. The power supply of claim 6, comprising resistance determining circuitry coupled to the processing circuitry and the output port, wherein the resistance determining circuitry is configured to determine the first resistance of the electrical conductors and configured to provide the first resistance to the processing circuitry.

9. The power supply of claim 6, comprising user interface circuitry coupled to the processing circuitry, wherein the user interface circuitry is configured to receive physical characteristics of the electrical conductors including at least one of: conductor size, conductor length, conductor material, and conductor identifying parameters, and wherein the processing circuitry is configured to determine the first resistance of the electrical conductors based on the physical characteristics received by the user interface circuitry.

10. The power supply of claim 6, wherein the processing circuitry is configured to:
   generate a first alarm indicating a degradation has occurred when a difference between the first resistance and the second resistance of the electrical conductors exceeds a first threshold level; and
   generate a second alarm indicating a threat to system operation has occurred after the first alarm when the difference between the first resistance and the second resistance of the electrical conductors exceeds a second threshold level higher than the first threshold level.

11. The power supply of claim 10, wherein the processing circuitry is configured to disable the output voltage at the output of the power supply when the difference between the first resistance and the second resistance of the electrical conductors exceeds the second threshold level.

* * * * *